Dec. 5, 1939.  F. EISELE  2,182,019

GUIDE FOR MACHINE TOOLS

Filed Jan. 15, 1937  3 Sheets-Sheet 1

Inventor:
Felix Eisele
By Young, Emery & Thompson
Attorney

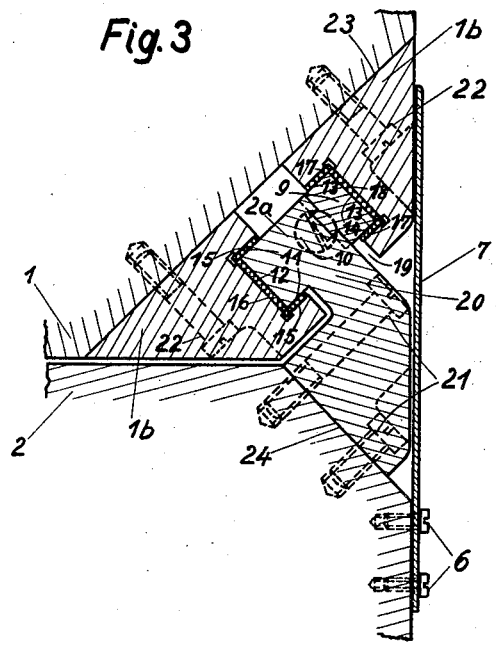
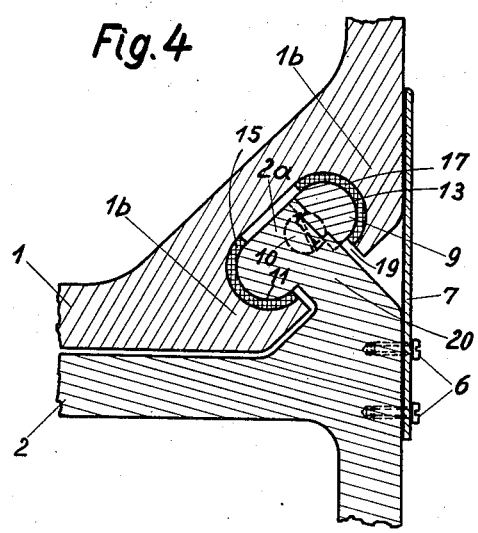

Dec. 5, 1939.  F. EISELE  2,182,019
GUIDE FOR MACHINE TOOLS
Filed Jan. 15, 1937   3 Sheets-Sheet 3
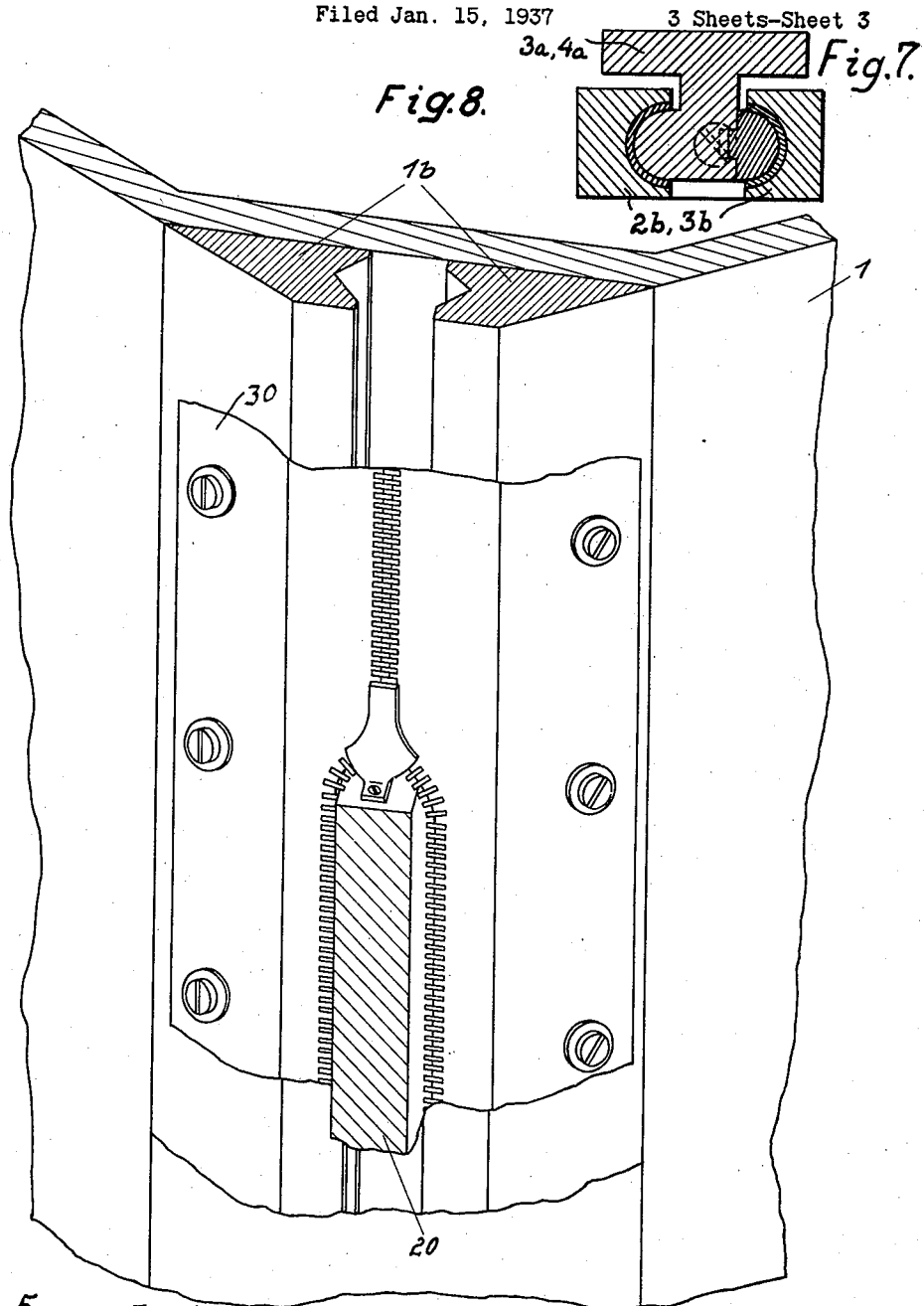
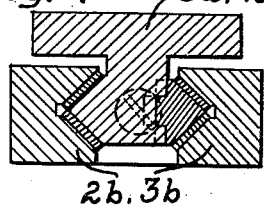
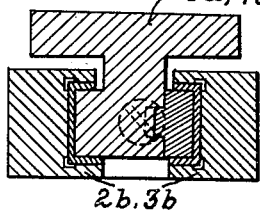
Inventor:
Felix Eisele
By Young, Emery & Thompson
Attorneys Patented Dec. 5, 1939

2,182,019

UNITED STATES PATENT OFFICE 2,182,019

GUIDE FOR MACHINE TOOLS

Felix Eisele, Rabenstein, near Chemnitz, Germany, assignor to Wanderer-Werke vorm. Winklhofer & Jaenicke Akt.-Ges., Siegmar-Schonau, Germany Application January 15, 1937, Serial No. 120,799
In Germany January 15, 1936

10 Claims. (Cl. 308—3)

This invention relates to guides for relatively slidable parts of machine tools, especially tables, traversing, and longitudinal slides of milling machines.

In the previously known guides for such slidable machine parts the guide surfaces are arranged mainly on the upper sides of the machine parts. Therefore they lie mostly open whereby dirt and cuttings fall on the guides, and during the movement of the machine parts this foreign matter ultimately finds its way between the bearing or contact surfaces of the guides. This is liable to cause injury to the guide surfaces with resulting detriment to the accuracy of guiding. Also the guides are not sufficiently resistive in all directions against forces tending to separate the guided parts from each other.

The primary purpose of the invention is to overcome the aforesaid disadvantages and to provide guide means giving positive protection against ingress of dirt and cuttings and capable of resisting all prevailing forces.

According to the present invention, one of the machine parts has arranged thereon a guide shoe while the other machine part has formed therein a guide track, the bearing surfaces of which track embrace the guide shoe at opposite sides thereof, and present a narrow gap externally for the connecting member between the guide shoe and the machine part carrying the same.

Figure 1:
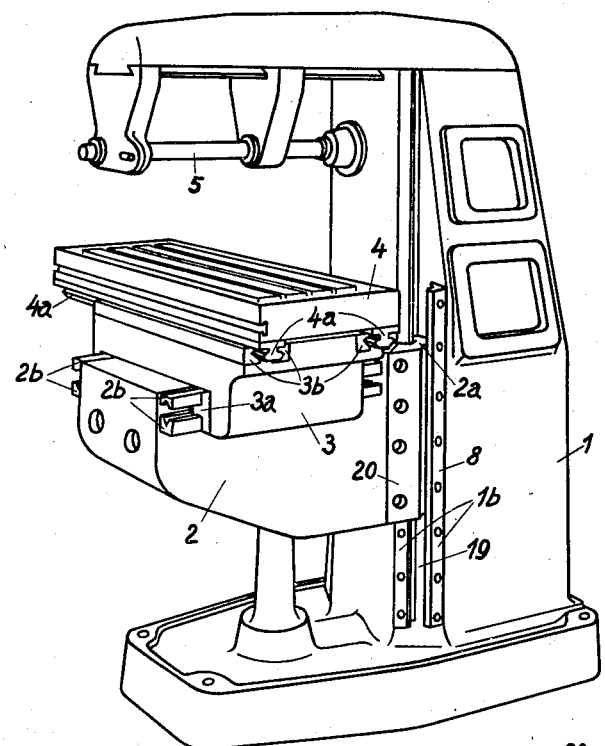
Figure 2:
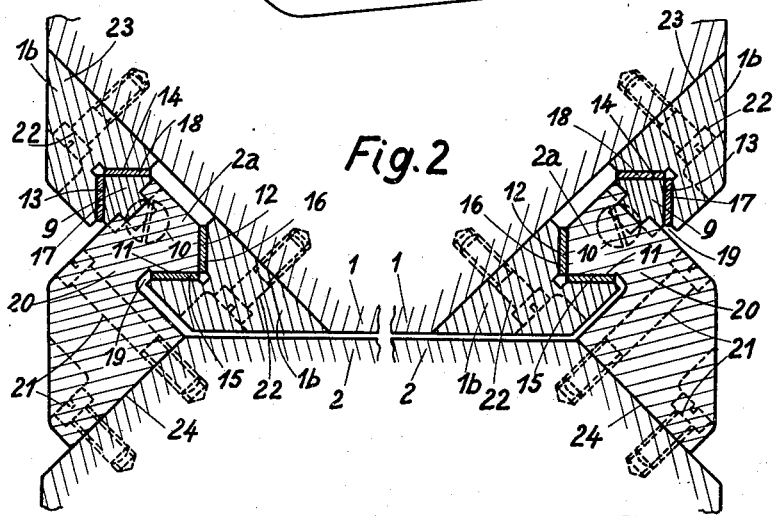

A milling machine embodying the guide means according to the present invention is illustrated by way of example in the accompanying drawings in which:

Figure 1 is a general view in perspective of the machine,

Figs. 2, 3, 4 are cross sections through the column of the machine, showing various embodiments of the guide, Figure 3 is a cross section through a portion of the column of the machine showing a modified construction, Figure 4 is a cross section of a modified construction of the guide track and shoes, Figures 5 to 7 are diagrammatic cross sections of three forms of the guide shoe and track, and Figure 8 is a perspective view of the cover strips applied to the guide track.

The machine illustrated has a columnar machine frame 1 with a table 2 slidable upwardly and downwardly on the column. The table 2 carries a cross slide 3 which can slide parallel to the longitudinal direction of the work spindle 5. On the cross slide 3 a work slide 4 is slidable longitudinally of the cross slide. The slidable machine parts 2, 3 and 4, instead of being provided with the ordinary flat or dove-tailed guides, are guided according to the present invention by means of narrow guides. Such a narrow guide consists of a guide shoe or ledge 2a, 3a or 4a of T-shape in cross-section provided on the respective machine part 2, 3 or 4, which shoe engages a guide track 1b, 2b or 3b in the other respective machine part 1, 2, or 3, said guide track being preferably formed of two elements. By T-shape is understood a structure in which the horizontal arms of the T correspond to the parts of the guide shoe 2a, 3a and 4a which contact the guide tracks 1b, 2b and 3b respectively while the vertical post of the T corresponds to the part which interconnects the horizontal arms of each guide shoe.

To provide reliable guiding of the slidable machine part under the influence of forces and moments in all directions, two or more such guide shoes are arranged as far as possible on opposite sides of one of the machine parts. They engage in correspondingly arranged guide tracks in the other machine part. A plurality of guide shoes may be provided distributed over the length of the machine part to be guided, said strips engaging in a common guide track.

The guide track and the guide shoes may be integral with the corresponding machine parts as shown in Fig. 4. They may also consist of elements separate from said parts and capable of being removably and exchangeably connected thereto as shown in Figs. 2 and 3. This non-integral arrangement makes it possible for the bearing surfaces, which are covered and would otherwise be difficult of access, to be easily accessible during machining so that they can be very accurately machined even on small inexpensive machines, whereby the machining of the guide means can be effected very inexpensively. In this way bearing surfaces of high grade can be economically provided not only at the time of assembly of the machine, but also in making repairs after long use.

A particularly convenient arrangement according to the invention is shown in Fig. 2 which illustrates the guide means between the table 2 and the column 1 of the machine. Similar guide means may be obviously used between the table 2 and the cross slide 3, and also between the cross slide 3 and the work slide 4 of the machine.

In Fig. 2 the guide track 1b has bearing surfaces 11, 12, 13, 14 embracing the guide shoe 2a at two opposing sides. These sides of the guide shoe are likewise provided with bearing surfaces corresponding to the bearing surfaces 11, 12, 13, 14 of the guide track 1b and sliding on the same. Preferably the bearing surfaces 11, 12, 13, 14 provided at one end of the guide shoe 2a are made adjustable by providing them with a wedge-shaped bar 9 connected to the guide shoe 2a which bar can be adjusted relatively to the guide shoe 2a by means of an adjusting member 10. To satisfactorily take care of all the forces exerted on the bearing surfaces 11, 12, 13, 14, the adjusting bar 9 is separately guided on the guide shoe 2a, preferably by means of a groove and spring.

The bearing surfaces 11, 12, 13, 14 of the guide track 1b are so arranged, according to the present invention, that they present externally only a narrow gap 19. The gap 19 need only be wide enough for the passage of the connecting member 20 by which the guide shoe 2a is attached to the machine part 2 supporting said shoe.

The bearing surfaces 11, 12, 13, 14 are preferably so arranged that in cross-section they present opposite open angles or arcs. Particularly favorable is a double V-shaped arrangement of the bearing surfaces, as shown in Fig. 2. The bearing surfaces may also present in cross-section a double U shape, as shown in Fig. 3, or arcs, as shown in Fig. 4, or may present different angles of inclination relative to each other for the opposite ends of the guide shoe 2a.

The bearing surfaces 11, 12, 13, 14 may also be formed on separate members 15, 16, 17, 18 which are removably attached to the guide shoe 2a, or to the parts of the guide track 1b. The exchangeable elements 15, 16, 17 and 18 may be made of materials having particularly high resistance to wear and low resistance to sliding.

In the embodiments illustrated in Figs. 2 and 3 the parts of the guide track 1b are attached to the machine part 1 preferably by means of counter-sunk screws 22. The guide shoe 2a is also formed as a separate element and is attached to the slidable machine part 2 by means of screws 21 engaging the connecting member 20. Both the guide track 1b and the guide shoe 2a may be mounted on oblique surfaces 23, 24 of the corresponding machine parts 1, 2 or 3, in order to save space. This arrangement of the guide means on oblique surfaces, has the further important advantage, for example in guiding the table on a column, that the torsion and bending moments exerted on the table are positively taken up by the guide means without exerting any expanding action.

The narrow gap 19 left between the bearing surfaces 11, 12, 13, 14 of the guide track 1b, and the possibility of arranging the narrow guide means according to the invention in protected locations on the machine parts, provide an effective protection against the dropping of cuttings and dirt onto the bearing surfaces of the guides. This protection can be still further improved by providing closure means for the narrow gap, the narrowness of which is particularly favorable for the provision of such means. A closure means comprising a zipper 31 attachment or the like on the cover strips 30, Fig. 8, can be used, which can be opened or closed by the guide strip moving in the guide track during operation.

The assembling of the bearing surfaces in a comparatively small space closed at the top greatly facilitates reliable and liberal lubrication of the bearing surfaces, with small loss of oil.

Strips protecting the outer surface of the guide tracks and shoes and consisting of sheet metal or other material may be arranged on the machine parts 1, 2, 3, 4 preferably by means of fastening screws. Such strips are shown par example in Figs. 3 and 4. The illustrated strips 7 are fastened by means of screws 6 to the machine part 2 and extending along the outer face of the connecting member 20 of the guide shoe 2a and along the outer face of the guide track 1b. In contrary to the illustrated arrangement the strips may also be fastened to the guide tracks so that they are not movable with the slidable parts i. e. the guide shoes. In the latter case the strips are preferably of approximately the same length as the guide tracks.

I claim as my invention:

1. In a machine tool, in combination, a supporting member, a reciprocating member slidable upon the supporting member, a pair of T-shaped guides provided in juxtaposition on one of the said members, and a pair of independent guide tracks carried by the other member for receiving the extending flanges of the T-shaped guides.

2. In a machine tool according to claim 1, in which the guide tracks are separate elements and are removably attached to the associated machine parts and in which fastening members are provided for attaching the tracks to their machine part.

3. In a machine tool according to claim 1, in which the guide tracks consist of separate elements which are removabaly attached to the corresponding machine part, and in which fastening means are provided for attaching the guide tracks to the machine part.

4. In a machine tool according to claim 1, in which exchangeable parts of wear resisting and antifriction material are provided on the guide tracks to form the bearing surfaces thereof.

5. In a machine tool according to claim 1, in which closure means are provided whereby the narrow gaps of the guide tracks are covered thereby, said closure means being in the form of sheet metal flaps which can slide together.

6. In a machine tool according to claim 1, in which closure means are provided whereby the narrow gaps of the guide tracks are covered thereby, said closure means being in the form of yielding cover strips provided with zipper connections.

7. In a machine tool, in combination, a supporting member, a reciprocating member slidable upon the supporting member, at least two guide means provided in juxtaposition on one of the said members, each of said guide means having lateral extensions at opposite sides, and a plurality of independent tracks carried by the other member and being adapted to embrace the lateral extensions of the said guide means.

8. In a machine tool, in combination, a supporting member, a reciproating member slidable upon the supporting member, at least two guides provided in juxtaposition on one of the said members, each of said guides having laterial extensions at opposite sides, each extension having two flat surfaces forming a V-shaped cross section with one another, and guide tracks provided at the other member for engaging both of the said surfaces.

9. In a machine tool, in combination, a supporting member, a reciprocating member slidable upon the supporting member, at least two guides provided in juxtaposition on one of the said members, each of said guides having lateral extensions at opposite sides, each extension having three flat surfaces arranged at right angles to each other for forming a U-shaped cross section, and guide tracks provided at the other member for engaging all of the said surfaces.

10. In a machine tool, in combination, a supporting member, a reciprocating member slidable upon the supporting member, at least two guides provided in juxtaposition on one of the said members, each of said guides having lateral extensions at opposite sides, each extension having a face in the form of an arch, the opposite faces of each guide being vaulted in opposite direction, and guide tracks provided at the other member for engaging the said vaulted faces.

FELIX EISELE.